United States Patent
Zelnick et al.

[15] 3,667,598
[45] June 6, 1972

[54] WRAPPED PALLET LOAD

[72] Inventors: Seymour Zelnick, Orange, N.J.; Martin Michael Wildmoser, Staten Island, N.Y.

[73] Assignee: Weldotron Corporation, Newark, N.J.

[22] Filed: Feb. 18, 1971

[21] Appl. No.: 116,454

Related U.S. Application Data

[62] Division of Ser. No. 765,302, Oct. 7, 1968.

[52] U.S. Cl. ...................... 206/65 S, 53/30, 206/45.33, 229/DIG. 12
[51] Int. Cl. .................. B65d 65/16, B65d 71/00, B65d 85/62
[58] Field of Search ...................... 206/65 S, 65 R, 45.33; 229/DIG. 12; 53/30; 215/38 A

[56] References Cited

UNITED STATES PATENTS

| | | | |
|---|---|---|---|
| 3,522,688 | 8/1970 | Kaliwoda et al. | 206/65 S |
| 3,529,717 | 9/1970 | McDougal | 206/65 S |
| 3,144,130 | 8/1964 | Copping | 206/65 S |

Primary Examiner—William T. Dixson, Jr.
Attorney—Harry Cohen

[57] ABSTRACT

A pallet load of product is secured onto a pallet by enclosing the load including the top thereof in thermoplastic film which is heat shrunk to the load, to a sheet of thermoplastic film on the pallet under the load, and to the edge of the pallet therearound. The load enclosing film may be an inverted bag which covers the top and side of the load and the lower end of the bag is fused to said sheet which is on the pallet under the load. Alternatively, the side of the load may be covered by a sleeve of thermoplastic material and the top of the load may be covered by a separate sheet to which the sleeve is fused. Also, layers of thermoplastic sheet material may be disposed between layers of the pallet load and heat sealed to the sleeve which surrounds the pallet load.

7 Claims, 11 Drawing Figures

INVENTORS
SEYMOUR ZELNICK
MARTIN MICHAEL WILDMOSER

ATTORNEY

INVENTORS
SEYMOUR ZELNICK
MARTIN MICHAEL WILDMOSER
BY
ATTORNEY

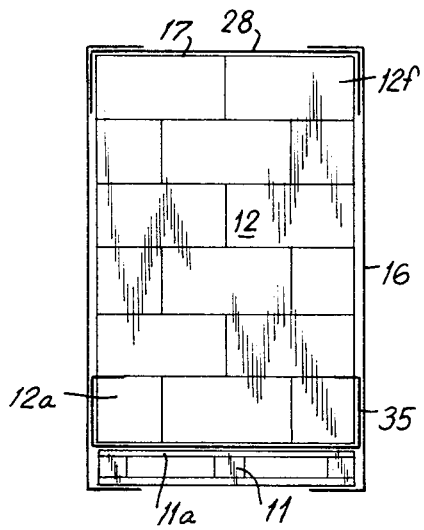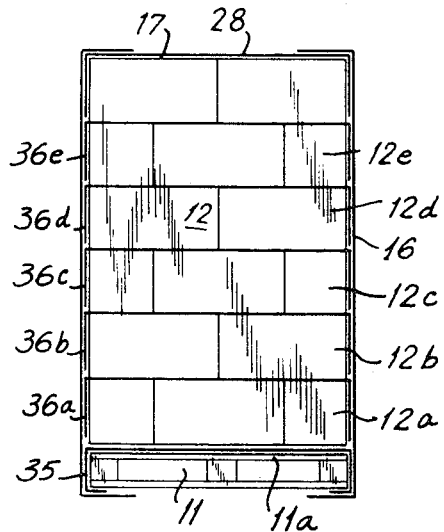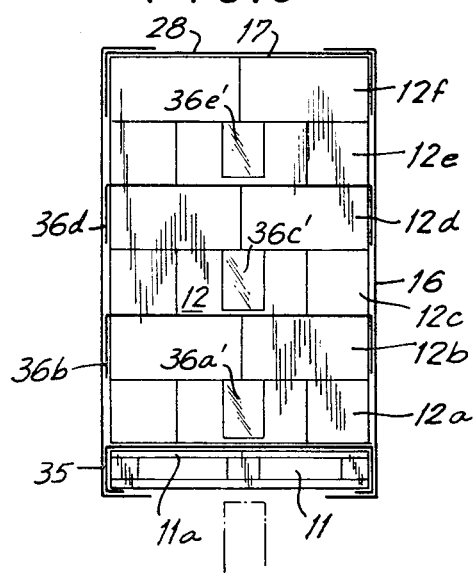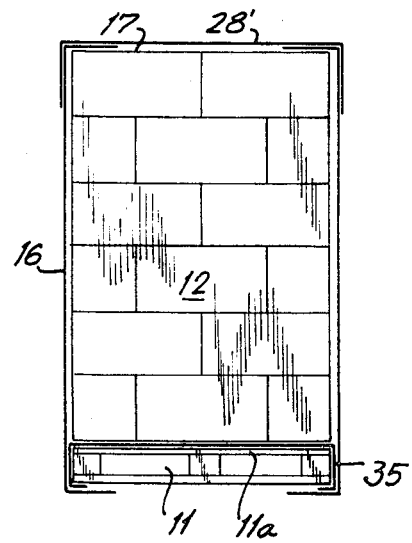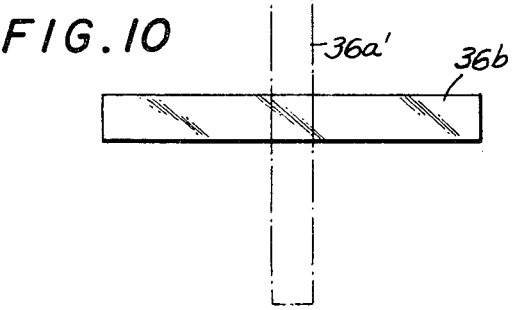

WRAPPED PALLET LOAD

This is a division of our U. S. Application, Ser. No, 765,302, filed Oct. 7, 1968.

DESCRIPTION OF THE INVENTION:

This invention relates to a wrapped pallet load, the load being covered at its top and/or its bottom by the wrapping material.

The packaging of articles in thermoplastic film is well known. Advantageously, the film is heat shrinkable, is initially sealed around the article and is subsequently heated to shrink the film tightly about the article. This initial sealed wrap may be accomplished manually, as for example, shown in U.S. Pat. No. 3,047,991 issued to M. Siegel et al. on Dec. 14, 1965. In U.S. Pat. application Ser. No. 56,044 filed June 24, 1970 now U.S. Pat. No. 3,596,434 as a continuation of Ser. No. 706,601, by S. Zelnick filed Feb. 19, 1968, now abandoned there is shown a method and an apparatus for shrink-film wrapping a pallet load. A load of product on a pallet is wrapped in a vertical sleeve of heat shrinkable thermoplastic film which is subsequently shrunk so that the entire pallet load is unitized, stabilized and protected against detrimental environmental conditions. The length of the vertical sleeve of film which is initially formed about the pallet load before the subsequent shrinking of the film is customarily considerably longer than the vertical height of the pallet load so as to allow sufficient film, on shrinking, for overlapping the peripheral margins of the top surface of the pallet load.

The film covering which leaves the top surface and/or bottom surface of the pallet load uncovered is sufficient for many applications. For some applications, however, such as, for example, outdoor storage, the top surface or the top and bottom surfaces of the pallet load or article must be covered. The top surface of the pallet load may be covered by draping said pallet load with an inverted bag of heat shrinkable film with the closed part of said bag on top of said pallet load.

The principal object of the present invention is to provide a new and improved fully wrapped and stabilized pallet load.

In accordance with one mode of practising the present invention, there is provided a method of fully wrapping a pallet load covering one of the top and bottom surfaces of the pallet load with a sheet of heat shrinkable film having a portion extending beyond the one of the surfaces. The pallet load is encircled with a primary sleeve of heat shrinkable film having a portion extending beyond one of the surfaces of the pallet load. The sheet and the sleeve are fused and shrunk around the pallet load. The top surface of the pallet load may be covered with a sheet of heat shrinkable film having a portion extending beyond the top surface, the bottom surface may cover a sheet of heat shrinkable film having a portion extending away from the bottom surface. Each of the sheets and the sleeve are shrunk and fused around the pallet load. The top surface of the pallet load may be covered with the sheet of heat shrinkable film. The bottom surface may rest on a sheet of heat shrinkable film having a portion extending below the platform of the pallet and the sleeve may extend below the platform of the pallet.

The sheets and the sleeve are compatible in respect to their fusing capability. The bottom surface may rest on a sheet of heat shrinkable film having a portion extending upward beyond the bottom surface. The pallet load may comprise a plurality of layers and the surface of selected ones of the layers of the pallet load may be covered with sheets of heat shrinkable film each having a portion extending beyond the covered surface of the corresponding layer. Each of the sheets is shrunk and fused to the sleeve. The pallet load may be covered by the sheet before it is encircled by the sleeve. The pallet load may be encircled by the sleeve before it is covered by the sheet. The surface of each of the layers of the pallet load may be covered with a sheet of film. The surface of selected ones of the layers of the pallet load may be partially covered with strips of heat shrinkable film each having a portion extending beyond the surface of the corresponding layer. Each of the strips is fused to the sleeve during the heat shrinking operation. The surface of each of the layers of the pallet load may be partially covered with a strip of film.

In accordance with the present invention, a method of providing a sleeve of plastic film tightly around an article including the entire top surface thereof and the entire bottom surface thereof, comprises providing a path for the article. The top surface of the article is covered with a sheet of heat shrinkable film having a portion extending beyond the top surfaces and along the sides of the article. The article is placed on a sheet of heat shrinkable film so that the bottom surface of the article covers the last-mentioned sheet and the last-mentioned sheet has a portion extending away from the bottom surface. The running ends of two webs of film from respective supplies thereof on opposite sides of the path are joined together in a vertical junction to provide a curtain of film across the path. The article is advanced against the curtain of film to carry the curtain along the path, additional film is withdrawn from the supplies and a bight is formed in the curtain around the article. Two spaced apart portions of the bight of film are joined together in a vertical junction closely behind the article to form a sleeve of film about the article. The sleeve is severed from the remainder of the webs to form a fresh curtain of film across the path. Each of the sheets is simultaneously fused to the sleeve during the heat shrinking operation. The sleeve and the sheets are heat shrunk about the article.

In accordance with the present invention apparatus for providing a sleeve of plastic film tightly around an article including the entire top surface thereof and the entire bottom surface thereof, comprises means for conveying the article along a path. A first film supply supplies a first sheet of film above the article covering and extending beyond the top surface of the article. A second film supply supplies a second sheet of film below the article covering and extending beyond the bottom surface of the article. Third and fourth film supplies respectively disposed on each side of the path supply third and fourth sheets of film. Sealing and cutting means join the running ends of the third and fourth sheets together in a junction perpendicular to the path for forming the third and fourth sheets into a curtain extending across the path and extending above the top surface of the article and below the bottom surface of the article. Joining means joins together spaced portions of the third and fourth sheets closely behind the article to form a sleeve of film around the article.

In order that the present invention may be readily carried into effect, it will now be described with reference to the accompanying drawings, wherein:

FIG. 7 is a side view of a modification of the embodiment of the method of FIGS. 4, 5 and 6;

FIG. 8 is a side view of another embodiment of the method of the present invention;

FIG. 9 is a side view of a modification of the embodiment of the method of FIG. 8;

FIG. 10 is a schematic view of the arrangement of the strips at the top and the bottom of an intermediate layer of the pallet load of FIG. 9; and FIG. 11 is a side view of another embodiment of the method of the present invention.

In the FIGS., the same components have the same reference numerals.

The method and apparatus of the present invention are an improvement over the method and apparatus of copending patent application Ser. No. 735,366, filed June 7, 1968, now U.S. Pat. No. 3,590,549 by S. Zelnick since the method and apparatus of the present invention completely and fully covers the pallet load, whereas the method and apparatus of the copending application leaves the top and bottom surfaces of the pallet load uncovered.

Figure 1:
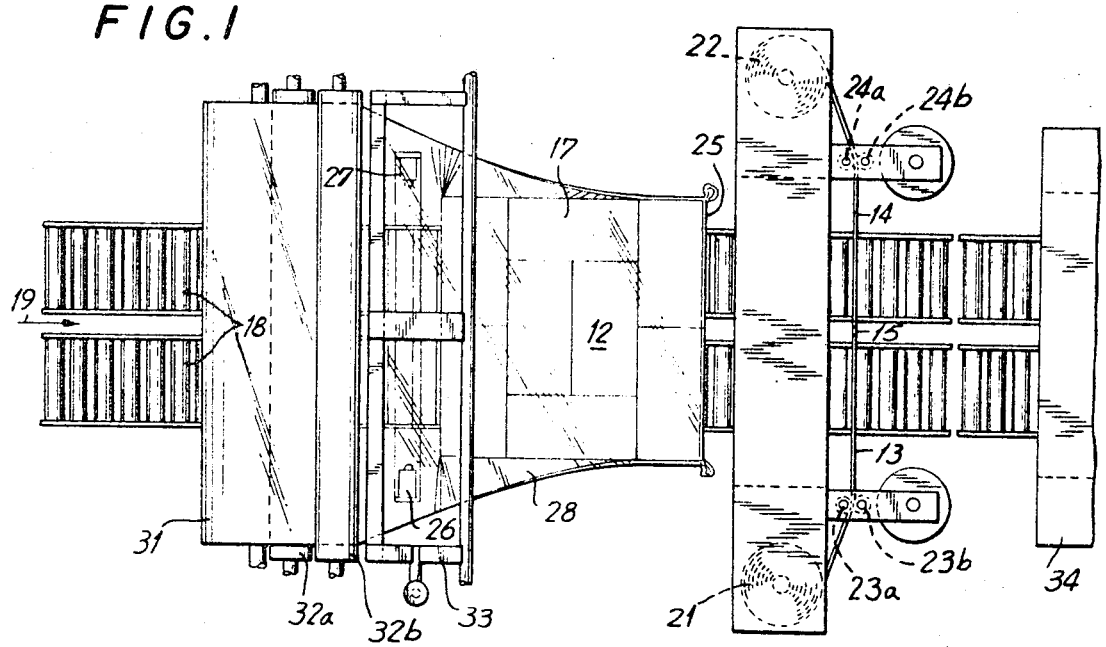
FIG. 1 is a top plan view of an embodiment of the apparatus of the present invention for fully wrapping a pallet load.
Figure 2:
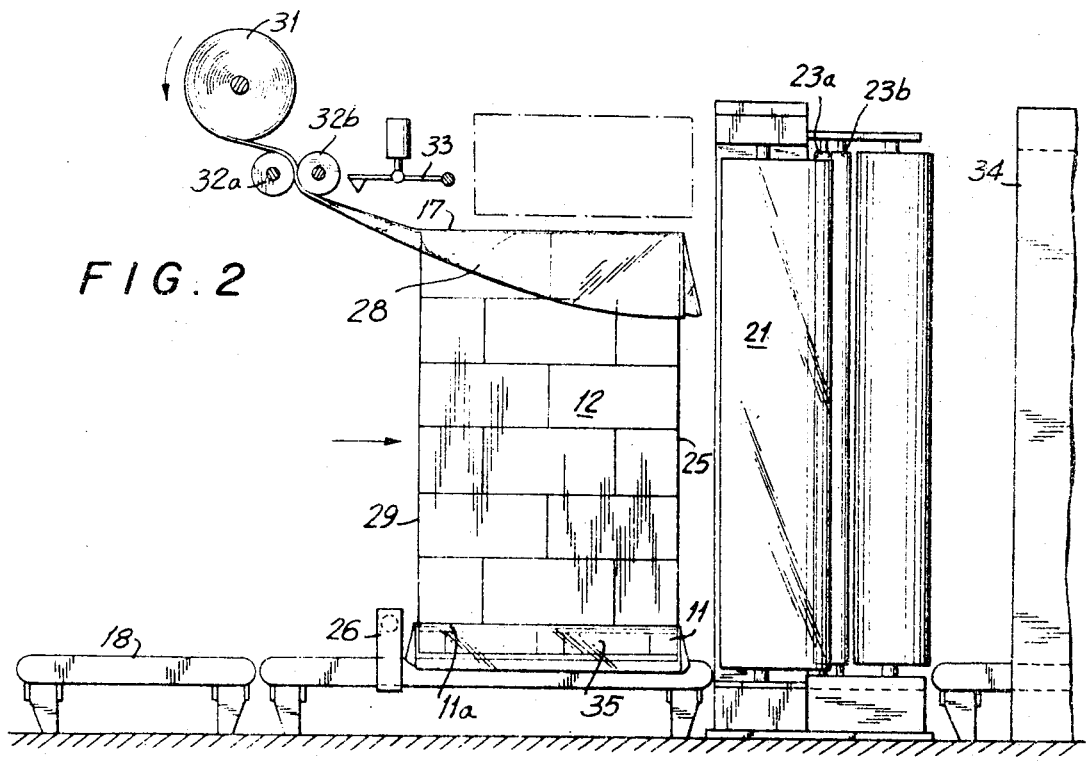
FIG. 2 is a side view of the apparatus of FIG. 1.

As disclosed in the aforedescribed copending patent application, and as shown in FIGS. 1 and 2, a pallet 11 bearing a load of products such as, for example, stacked boxes 12, is wrapped in a vertical sleeve provided by a sheet or web of film 13 and another sheet or web of film 14 joined together in a vertical weld 15 on the leading face of the load and joined together in a vertical weld (not shown in the FIGS.) on the trailing face of the load to form a sleeve 16 around the pallet load (FIGS. 6, 7, 8, 9 and 11). A portion (not shown in the FIGS.) of the vertical sleeve 16 extends up above the top surface 17 (FIGS. 1, 2, 5, 6, 7, 8, 9 and 11) of the load. A portion (not shown in the FIGS.) of the vertical sleeve 16 may extend down below the platform 11a of the pallet, if desired.

The pallet load 12 may be encircled by the vertical sleeve 16 of heat shrinkable film by any suitable method or apparatus. One such suitable method and apparatus is that disclosed in said copending patent application.

As shown in FIGS. 1 and 2, and as disclosed in said copending patent application, the pallet 11 bearing load of stacked boxes 12, is carried by an open midline in feed conveyor 18 in the direction of an arrow 19. A curtain of film 13, 14, which has at least some resiliency, extends across the conveyor and unwinds from two vertically journalled supply rolls 21 and 22. A pair of sealing and clamping or sealing and cutting jaw assemblies, not shown in the FIGS., but fully disclosed in said copending patent application, extend vertically and are supported between an overhead, horizontal guide member and a lower horizontal guide member, and are laterally movable by suitable means such as, for example, chains or air cylinders, as fully disclosed in said copending patent application.

As disclosed in said copending patent application, the loaded pallet 11 is advanced against the curtain 13, 14 of film, and carriers said curtain along, unwinding film from the supply rolls 21 and 22 and between two pairs of pinch rollers 23a, 23b and 24a, 24b (FIG. 1). The loaded pallet 11 continues to advance until the trailing edge of said pallet has advanced a sufficient distance beyond the jaw assemblies, so as to clear these assemblies. This position is detected by a photocell, energized by a light source, as disclosed in said copending patent application, and not shown in the FIGS. The photocell actuates a relay circuit to halt the conveyor and to start the jaw assemblies moving towards each other, to close behind the loaded pallet 11 onto the bight of the web to seal and sever the two superposed webs or sheets of film 13 and 14 thus forming the vertical sleeve 16 of film about said loaded pallet, and simultaneously forming a new curtain of film between the supply rolls 21 and 22 for the next successive loaded pallet, as disclosed in said copending patent application. Details of exemplary structure of the jaw assemblies are disclosed in copending patent application, Ser. No. 706,601.

In accordance with the present invention, the top surface 17 of the pallet load 12 is covered with a sheet of heat shrinkable film having a portion extending beyond said surface. Thus, as shown in FIGS. 1 and 2, as the pallet load 12 is conveyed along the in-feed conveyor 18 of the automatic wrapper, its leading edge 25 is sensed by a photocell or other suitable sensing device 26, 27 (FIG. 1). The sensing device 26, 27 actuates film sheet supply apparatus via any suitable coupling arrangement such as, for example, an electrical circuit, as shown in FIG. 3.

When the film sheet supply apparatus is actuated, it supplies a sheet of heat shrinkable film 28 from its position over the top surface 17 of the pallet load 12 at the same rate of speed as that of said pallet load. The sheet 28 is thus draped over and covers the top of the pallet load 12.

Figure 3:
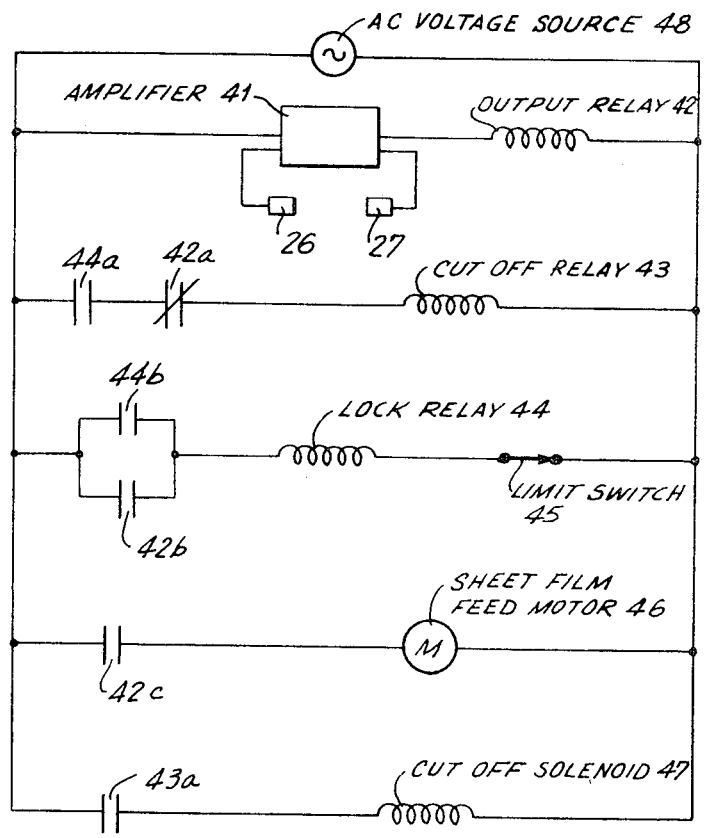
FIG. 3 is a circuit diagram of an embodiment of an electrical control circuit for the apparatus of the present invention.

When the trailing edge 29 of the pallet load 12 is sensed by the sensing device 26, 27, the sheet 28 is automatically severed or cut by any suitable means such as, for example, a cutting device coupled by any suitable coupling arrangement such as, for example, an electrical circuit, as shown in FIG. 3, to said sensing device.

The sheet 28 is unwound from a supply roll 31, which is suitably rotatably mounted over the level of the top surface 17 of the pallet load 12. The sheet 28 supplied from the supply roll 31 passes between a pair of pinch or guide rollers 32a and 32b.

Another sheet of heat shrinkable film may be unwound from a supply roll which is suitably rotatably mounted under the conveyor 18 under the level of the platform 11a of the pallet 11, if desired, to provide a sheet of film for covering the bottom surface of the pallet load 12. Since the bottom surface covering sheet may be facilely and rapidly provided manually, the bottom mounted supply roll may be dispensed with and is not disclosed herein.

The length and width of the sheet 28 are so proportioned, relative to the dimensions of the pallet load 12, that said sheet fully covers the top surface 17 and also drapes down about 6 inches on each side of said pallet load (FIGS. 2, 4, 5, 6, 8, 9 and 11). After the top sheet 28 is cut, by a cutting device 33 (FIG. 2), for example, the pallet load 12 covered at its top surface 17 with said top sheet, is moved into the vertically extending curtain 13, 14 of film, as hereinbefore described, and the vertical sleeve 16 is produced, as hereinbefore described. The entire pallet load assembly is then moved into heat shrinking and fusing apparatus 34, where the portion of the sleeve 16 which extends above the top surface 17 of the pallet load is mechanically locked and fused with the top sheet 28.

After the heat shrinking and fusing of the sheet of film 28 to the sleeve 16 in the heat shrinking and fusing apparatus 34, the pallet load is completely covered with a fully sealed, closed watertight top cover. When the top sheet 28 is a relatively thin film, of up to about 0.003 or 0.004 inch in thickness, said film is sufficiently flexible or pliable to drape in the desired manner. When considerably thicker films are utilized, however, they may be too stiff to drape in the desired manner, but may be made more pliable or flexible by the application of heat simultaneously with the supply of the sheet 28.

It may be desirable to totally seal or wrap the pallet load or article by covering the bottom surface thereof and fusing the bottom surface cover with the sleeve 16, in addition to fusing the top surface cover or sheet 28 with said sleeve. Thus, before the load 12 is positioned on the pallet 11, a bottom sheet of film 35 (FIGS. 2, 4, 5, 6, 8, 9 and 11) is draped over said pallet. The bottom sheet 35 is compatible with the vertical sleeve film 16, and is heat shrinkable film. Thus, if the vertical sleeve 16 is polyethylene, the bottom sheet 35 is also polyethylene.

The bottom sheet 35 is proportioned so that it completely covers the pallet 11 and also drapes down about 4 to 6 inches on each side of said pallet (FIGS. 2, 4, 5, 6, 8, 9 and 11). After the pallet 11 is covered by the bottom sheet 35, the load 12 is placed or stacked on said bottom sheet in the usual manner. The pallet load 12 is then covered by the top sheet 28 and the sleeve 16 in the aforedescribed manner, or by a bag.

After the pallet load 12 is stacked on the bottom sheet of film 35 and the top and sides of said pallet load are covered, the entire pallet load assembly is moved into the heat shrinking and fusing apparatus 34, where the portion of the sleeve 16 which extends below the bottom surface of the pallet load is mechanically locked and fused with said bottom sheet. The pallet load 12 is then completely sealed at top, bottom and all four sides.

Figure 5:
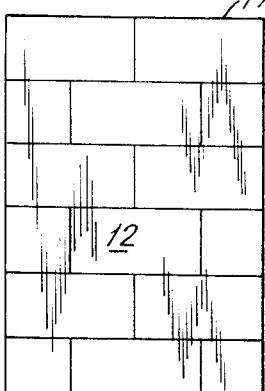
FIG. 5 is a side view of the second step of the embodiment of the method of FIG. 4.
Figure 6:
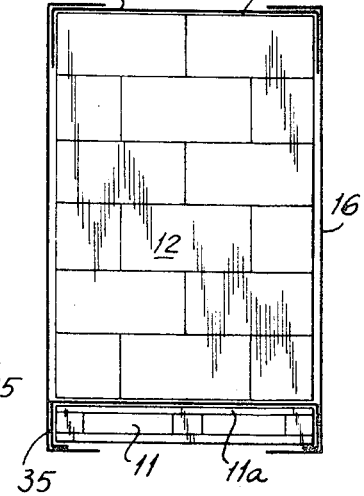
FIG. 6 is a side view of a later step of the embodiment of the method of FIGS. 3 and 4.
Figure 4:
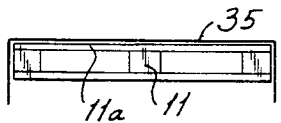
FIG. 4 is a side view of the first step of an embodiment of the present invention.

The aforedescribed method of completely covering and sealing the pallet load 12 in which the bottom sheet 35 is first draped on the pallet 11, the top sheet 28 is then draped on said pallet, the sleeve 16 is then wrapped around said pallet load, and said top and bottom sheets are shrunk and fused with said sleeve, which is also shrunk, is illustrated in FIGS. 4, 5 and 6. In FIG. 4, the bottom sheet 35 is draped on the pallet 11. In FIG. 5, the load 12 covers the bottom sheet 35 on the pallet 11. In FIG. 6, the top sheet 28 is draped on the pallet load 12 positioned on the bottom sheet 35 and the sleeve 16 covers said pallet load in overlapping relation with the sides of each of said top and bottom sheets.

The sides of the bottom sheet 35 may be pulled upward around the bottom layer 12a of the pallet load 12, as shown in FIG. 7, rather than hang or drape down around the pallet 11, as in the embodiment of FIGS. 4, 5 and 6. The vertical sleeve 16 fuses with the bottom sheet 35 of FIG. 7 when said sleeve is shrunk.

In another embodiment of the method of the present invention, each layer of the pallet load 12 is covered with a sheet of film, as shown in FIG. 8. In FIG. 8, the bottom layer 12a of the pallet load 12 is covered by a sheet 36a, the second layer 12b is covered by a sheet 36b, the third layer 12c is covered by a sheet 36c, the fourth layer 12d is covered by a sheet 36d, and the fifth layer 12e is covered by a sheet 36e.

Alternate layers or selected layers of the pallet load 12 may be covered with sheets of film in a modification of the embodiment of the method of FIG. 8, as illustrated in FIG. 9. In FIG. 9, only the second layer 12b and the fourth layer 12d are covered by sheets 36b and 36d, respectively, besides the top layer 12f being covered by the top sheet 28.

The intermediate sheets of film 36a, 36b, 36c, 36d and 36e or 36b and 36d form fusion zones along the entire height of the pallet load 12. The intermediate sheets are not utilized for closure or sealing purposes, but rather to provide a monolithic honeycomb structure which improves the strength and stability of the pallet load 12 considerably. As shown FIGS. 9 and 10, the intermediate sheets of film may comprise strips of film rather than full sheets. The replacement of full intermediate sheets with intermediate strips provide strength and stability approaching those provided by the full intermediate sheets, at a lower material cost.

In FIG. 9, each of the intermediate sheets 36b and 36d may be an intermediate strip. The first layer 12a of the pallet load 12 bears a strip of film 36a', also shown in FIG. 10, the second layer 12b bears a strip of film 36b, also shown in FIG. 10 and positioned perpendicularly to the strip 36a'. The third layer 12c bears a strip of film 36c' positioned perpendicularly to the strip 36b, the fourth layer 12d bears a strip of film 36d positioned perpendicularly to the strip 36c', and the fifth layer 12e bears a strip of film 36e' positioned perpendicularly to the strip 36d.

FIG. 11 illustrates another embodiment of the method of the present invention, wherein the vertical sleeve 16 is provided around the pallet load 12 before the top sheet 28' is draped over the top of said pallet load. The fusing of the top and bottom sheets 28' and 35 with the sleeve 16 provided a completely sealed and fully wrapped pallet load.

FIG. 3 illustrates a top sheet 28 supply and cutoff control circuit for a pallet load 12. In FIG. 3, the sensing device 26, 27 comprises a light source 26 and a photosensitive device or photocell 27. The source 26 and photocell 27 are spaced from each other by more than the corresponding dimension of the pallet load, as shown in FIG. 1, and each is electrically connected in circuit via an amplifier 41.

An output relay 42 of the photocell 27 is connected in a first series circuit arrangement with the photocell amplifier 41. When the light beam from the light source 26 to the photocell 27 is interrupted by the leading edge of the pallet 11 (FIGS. 1 and 2), the output relay 42 is energized, due to a decrease in the electrical resistance provided by said photocell and a corresponding increase in current through said output relay.

A cutoff relay 43 is connected in a second series circuit arrangement with first electrical contacts 42a of the relay 42 and first electrical contacts 44a of the lock relay 44. A lock relay 44 is connected in a third series circuit arrangement with a limit switch 45 and the parallel connection of second electrical contacts 42b of the relay 42 and second electrical contacts 44b of the relay 44. A sheet film feed motor 46 is connected in a fourth series circuit arrangement with third electrical contacts 42c of the relay 42. A cutoff solenoid 47 of the cutting device 33 (FIG. 2) is connected in a fifth series circuit arrangement with first electrical contacts 43a of the cutoff relay 43.

The first, second, third, fourth and fifth series circuit arrangements are connected in parallel across an AC voltage source 48. The AC voltage source 48 may provide, for example, 110 volts at 60 cycles per second.

When the light beam is interrupted by the pallet 11, so that the output relay 42 is energized, as hereinbefore described, said output relay closes its contacts 42b and 42c. When the relay 42 is energized, it opens its normally closed contacts 42a. When the contacts 42c are closed, the circuit for energizing the sheet film feed motor 46 is closed, so that said motor operates to feed the film 28 (FIGS. 1 and 2). Simultaneously, when the contacts 42b are closed, the lock relay 44 is energized, since its energizing circuit is closed through the automatically operated limit switch 45.

After the pallet 11 has completely passed through the light beam between the light source 26 and the photocell 27, said light beam is restored and the output relay 42 is deenergized, due to an increase in the electrical resistance provided by said photocell and a corresponding decrease of current through said output relay. When the output relay 42 is deenergized, it opens its contacts 42b and 43c, but its contacts 42a close. The contacts 44a of the lock relay 44 are closed, since when said lock relay is energized, it locks itself into its energized condition by closing its contacts 44b in series connection with itself.

Thus, the return of the light beam energizes the cutoff relay 43 by deenergizing the output relay 42 and thereby closing the energizing circuit of said cutoff relay. When the cutoff relay 43 is energized, it closes its contacts 43a, thereby closing the energizing circuit of the cutoff solenoid 47 and energizing said cutoff solenoid. At the termination of the cutting stroke of the cutting device 33, actuated by the cutoff solenoid 47, said device closes a circuit which energizes a relay (not shown in the FIGS.) to open the limit switch 45. When the limit switch 45 is opened, the lock relay 44 is deenergized and opens its own energizing circuit by opening its contacts 44b and that of the cutoff relay 43 by opening its contacts 44a, thereby returning the circuit of FIG. 3 to its initial condition.

As hereinbefore stated the covering for the top and side of the pallet load may be in the form of an inverted bag which is draped over the load whereby the closed end of the bag constitutes the cover for the top of the load, the lower end of the inverted bag being fused to the sheet of film which is under the load as above described. Thus, in view of the present disclosure the side of the bag may be considered as a sleeve with which the part of the film on top of the load is integral.

While the invention has been described by means of specific examples and in specific embodiments, we do not wish to be limited thereto, for obvious modifications will occur to those skilled in the art without departing from the spirit and scope of the invention.

What is claimed is:

1. A pallet load, comprising a pallet, a load carried by said pallet, a layer of heat-sealable thermoplastic film covering the top of the load, a sleeve of heat sealable thermoplastic film surrounding the load and the pallet and heat sealed to said layer and heat-shrunk around the load, and the pallet, and a second layer of heat sealable thermoplastic film covers the top of the pallet and is heat sealed to the sleeve around the lower part of the load.

2. A pallet load, comprising a pallet, a load carried by said pallet, a layer of heat-sealable thermoplastic film covering the top of the load, a sleeve of heat-sealable thermoplastic film surrounding the load and the pallet and heat sealed to said layer and heat-shrunk around the load and the pallet said load being arranged in a plurality of discrete layers vertically of the load, and a layer of heat-sealable thermoplastic material being disposed between said layers of the load.

3. A pallet load according to claim 1, further characterized in that the second layer of heat-sealable thermoplastic film covers the top of the pallet and is heat sealed to the sleeve around the lower part of the load, in that said load is arranged in a plurality of discrete layers vertically of the load, and in that a layer of heat-sealable thermoplastic material is disposed between said layers of the load.

4. A pallet load according to claim 2, further characterized in that said film layer between said layers of the load is narrower than the adjacent load layers and has its ends heat sealed to the sleeve which surrounds the load.

5. A pallet load, comprising a pallet, a load carried by said pallet, a layer of heat-sealable thermoplastic film covering the top of the load, a sleeve of heat-sealable thermoplastic film surrounding the load and the pallet and heat sealed to said layer and heat-shrunk around the load and the pallet, said sleeve being integral with said layer of film which covers the top of the load.

6. A pallet load according to claim 5, further characterized in that said load is arranged in a plurality of discrete layers vertically of the load, and in that a layer of heat-sealable thermoplastic material is disposed between certain of said layers of the load.

7. A pallet load according to claim 6, further characterized in that said film layer between said layers of the load is narrower than the adjacent load layers and has its ends heat sealed to the sleeve which surrounds the load.

* * * * *